United States Patent
Morimoto et al.

(10) Patent No.: US 8,111,172 B2
(45) Date of Patent: Feb. 7, 2012

(54) NAVIGATION APPARATUS AND COMPUTER PROGRAM

(75) Inventors: Kyomi Morimoto, Nishio (JP); Seiji Hayashi, Okazaki (JP); Yutaka Saitou, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 370 days.

(21) Appl. No.: 12/314,052

(22) Filed: Dec. 3, 2008

(65) Prior Publication Data

US 2009/0167565 A1    Jul. 2, 2009

(30) Foreign Application Priority Data

Dec. 28, 2007    (JP) ................. 2007-339875

(51) Int. Cl.
    *B60Q 1/48*    (2006.01)
(52) U.S. Cl. ...... 340/932.2; 340/933; 340/5.2; 340/988; 340/990; 340/10.1; 701/1; 701/200; 701/202; 701/207; 701/211
(58) Field of Classification Search ............... 340/932.2, 340/933, 5.2, 309.16, 825.49, 988–996, 10.1; 701/1, 200, 202, 207, 209, 211, 201, 208, 701/213, 214; 235/384; 194/214, 211, 902, 194/200; 283/102; 370/231; 705/4, 13
See application file for complete search history.

(56) References Cited

U.S. PATENT DOCUMENTS

| | | | |
|---|---|---|---|
| 5,910,782 A | 6/1999 | Schmitt et al. | |
| 6,970,101 B1 | 11/2005 | Squire et al. | |
| 2002/0147543 A1* | 10/2002 | Gieseke | 701/200 |
| 2003/0146852 A1* | 8/2003 | O'Dell | 340/932.2 |
| 2006/0253226 A1* | 11/2006 | Mendelson | 701/1 |

FOREIGN PATENT DOCUMENTS

| | | |
|---|---|---|
| DE | 101 11 588 A1 | 10/2002 |
| JP | A-2001-202544 | 7/2001 |
| JP | A-2001-349740 | 12/2001 |
| JP | A-2002-373398 | 12/2002 |

OTHER PUBLICATIONS

Nov. 15, 2010 European Search Report issued in EP 08 02 0332.
Japanese Patent Office, Notice of Reasons for Rejection mailed Sep. 27, 2011 in Japanese Patent Application No. 2007-339875 w/English-langunge Translation.

* cited by examiner

*Primary Examiner* — George Bugg
*Assistant Examiner* — Sisay Yacob
(74) *Attorney, Agent, or Firm* — Oliff & Berridge, PLC

(57) ABSTRACT

A vehicle guidance device is configured such that, in a case where a vehicle is parked in an on-street parking zone, the vehicle guidance device specifies a parking meter from among the parking meters for the on-street parking zone in which the vehicle is parked, then provides guidance to the position where the specified parking meter is installed. In a case where an on-street parking zone is located in the vicinity of the vehicle's current position while the vehicle is in motion, the vehicle guidance device provides guidance to the position of a parking meter for the on-street parking zone.

11 Claims, 10 Drawing Sheets

FIG. 3

FACILITY DATA PERTAINING TO ON-STREET PARKING ZONES

| IDENTIFICATION ID | A | B | C | D | ... | X |
|---|---|---|---|---|---|---|
| LINK ID | 000001 | 002468 | 000123 | 004444 | ... | 004989 |
| HOURS AVAILABLE | 0:00-24:00 | 0:00-24:00 | 0:00-24:00 | 8:00-18:00 | ... | 0:00-24:00 |
| USE FEE | NO CHARGE | 700 YEN / 60 MINUTES | 100 YEN / 60 MINUTES | 200 YEN / 60 MINUTES | ... | NO CHARGE |
| LOCATION COORDINATES | (x1,y1)-(x2,y2) | (x3,y3)-(x4,y4) | (x5,y5)-(x6,y6) | (x7,y7)-(x8,y8) | ... | (x21,y21)-(x22,y22) |
| VACANT SPACE PROBABILITY | 0.42 | 0.45 | 0.55 | 0.35 | ... | 0.95 |
| USER RESTRICTIONS | NO | NO | NO | NO | ... | YES (RESIDENTS ONLY) |
| PARKING METER COORDINATES | --- | (X1,Y1) | (X2,Y2) | (X3,Y3), (X4,Y4) | | — |
| ... | ... | ... | ... | ... | ... | ... |

FIG.9

EN ROUTE LIST

| SEQUENCE NUMBER | 1 | 2 | 3 | 4 |
|---|---|---|---|---|
| DISTANCE TO DESTINATION | 800m | 600m | 300m | 50m |
| LINK ID | 003458 | 003462 | 003463 | 003496 |
| LOCATION COORDINATES | (x11,y11)-(x12,y12) | (x21,y21)-(x22,y22) | (x31,y31)-(x32,y32) | (x41,y41)-(x42,y42) |
| HOURS AVAILABLE | 7:00-23:00 | 0:00-24:00 | 0:00-24:00 | 8:00-21:00 |
| USE FEE | 100 YEN / 60 MINUTES | 200 YEN / 60 MINUTES | NO CHARGE | 150 YEN / 60 MINUTES |
| VACANT SPACE PROBABILITY | 0.66 | 0.58 | 0.42 | 0.40 |
| USER RESTRICTIONS | NO | NO | NO | NO |
| PARKING METER COORDINATES | (X11,Y11) | (X21,Y21), (X21,Y21) | --- | (X41,Y41) |
| ... | ... | ... | ... | ... |

NAVIGATION APPARATUS AND COMPUTER PROGRAM

INCORPORATION BY REFERENCE

The disclosure of Japanese Patent Application No. 2007-339875 filed on Dec. 28, 2007, including the specification, drawings and abstract is incorporated herein by reference in its entirety.

BACKGROUND OF THE INVENTION

1. Field of the Invention

The present invention relates to a vehicle guidance device and a computer program that provide various information guidance to the vehicle.

2. Description of the Related Art

In recent years, a navigation device that provides driving guidance and makes it easy for a driver to arrive at a desired destination has been installed in many vehicles. The navigation device is a device that is capable of detecting a vehicle's current position with a GPS receiver or the like, acquiring map data that corresponds to the current position through a network or from a storage medium such as a DVD-ROM, a HDD, or the like, and displaying the map data on a liquid crystal monitor. The navigation device is also provided with a route search function that, when the desired destination is input, searches for an optimum route from the vehicle's position to the destination. The navigation device then displays the guidance route on a display screen and reliably guides the driver to the desired destination by providing guidance by voice in situations such as when the vehicle approaches an intersection. In addition, some navigation devices have a function that provides guidance to parking sites near the vehicle's current position or in the vicinity of the destination.

For example, in Japanese Patent Application Publication No. JP-A-2001-349740 (Page 6 to Page 7, FIG. 1, and FIG. 2), a technology is described that searches from data pertaining to parking sites for parking sites at or near a destination that the user has input, then from among the search results, displays the parking sites that match what the user wants. These may be the parking sites that are available at a specified date and time, or the parking sites that match conditions such as the vehicle width, the vehicle height, and the model of the user's vehicle. The technology also acquires congestion information and vacancy information for the parking sites.

SUMMARY OF THE INVENTION

The technology that is described in Japanese Patent Application Publication No. JP-A-2001-349740 (Page 6 to Page 7, FIG. 1, and FIG. 2), provides guidance to a parking site that is provided within a specified area that is off of the street. However, on-street parking zones are also provided in addition to the parking sites that are provided off-street.

On-street parking zones are parking zones that are provided on the street. On-street parking zones are seen especially often in the cities of Europe and North America, and parking in the on-street parking zones is very common. In cases where fees are charged, the fees for parking are paid by using parking meters.

However, the technology that is described in Japanese Patent Application Publication No. JP-A-2001-349740 (Page 6 to Page 7, FIG. 1, and FIG. 2), does not provide guidance for the on-street parking zones. Moreover, the off-street parking site has a clearly defined entrance, so the user can pay the fee at the entrance, but the on-street parking zone does not have a specific entrance, so the position of the parking meter is not clearly defined.

Therefore, in a case where a traveler or the like who is not familiar with the streets wants to park in the on-street parking zone, he must search for the parking meter. Depending on where the vehicle is parked, considerable time may be consumed in finding the parking meter, imposing a significant burden on the user.

The present invention was devised in order to solve problems with related art, and it is an object of the present invention to provide a vehicle guidance device and a computer program that are capable of informing the user in advance of the position of the parking meter for the on-street parking zone, thereby decreasing the burden on the user when he parks in the on-street parking zone.

According to the vehicle guidance device in a first aspect of the present invention, it is possible to make the user aware of the position of the parking meter for the on-street parking zone in advance. This makes it possible to reduce the burden on the user of searching for a parking meter after the vehicle is parked, even in a case where, for example, the parking meter is not visible from the position where the vehicle is parked. It is also possible to enable the user to park close to the position of a parking meter. It is therefore possible to reduce the burden on the user when he parks in an on-street parking zone.

According to the vehicle guidance device that is described in a second aspect, it is possible to make the user who has parked in an on-street parking zone easily aware of the position of the parking meter for the parking zone. It is therefore possible to reduce the burden on the user of searching for a parking meter after the vehicle is parked.

According to the vehicle guidance device that is described in a third aspect, the user who has parked in an on-street parking zone that is provided with a plurality of parking meters can be made aware of the position of the parking meter that is closest and easiest to use of all of the parking meters.

According to the vehicle guidance device that is described in a fourth aspect, it is possible the user who has parked in an on-street parking zone that is provided with a plurality of parking meters can be made aware of the position of a suitable parking meter that is easy to use among all of the parking meters.

According to the vehicle guidance device that is described in a fifth aspect, it is possible to make the user aware in advance of the position of a parking meter that is located in the vicinity of the vehicle before the user parks in the on-street parking zone. It is therefore possible to enable the user to park close to the position of a parking meter, which can reduce the burden on the user when he parks in an on-street parking zone.

According to the vehicle guidance device that is described in a sixth aspect, it is possible to make a user who is driving in accordance with a guidance route aware in advance of the position of a parking meter that is located on the guidance route. It is therefore possible for the user to park close to the position of the parking meter in advance, which can reduce the burden on the user when he parks in an on-street parking zone. Moreover, reducing the amount of guidance that the user does not need makes it possible to provide guidance that is easier for the user to understand.

According to the computer program that is described in a seventh aspect, it is possible to make the user aware of the position of the parking meter for the on-street parking zone in advance. This makes it possible to reduce the burden on the user of searching for a parking meter after the vehicle is parked, even in a case where, for example, the parking meter is not visible from the position where the vehicle is parked. It is also possible to enable the user to park close to the position of a parking meter in advance. It is therefore possible to reduce the burden on the user when he parks in an on-street parking zone.

BRIEF DESCRIPTION OF THE DRAWINGS

FIG. 3 is a figure that shows an example of facility data that pertain to on-street parking zones and are stored in a map information data base;

FIG. 9 is a figure that shows an example of an en route list; and

DETAILED DESCRIPTION OF THE PREFERRED EMBODIMENTS

Figure 1:
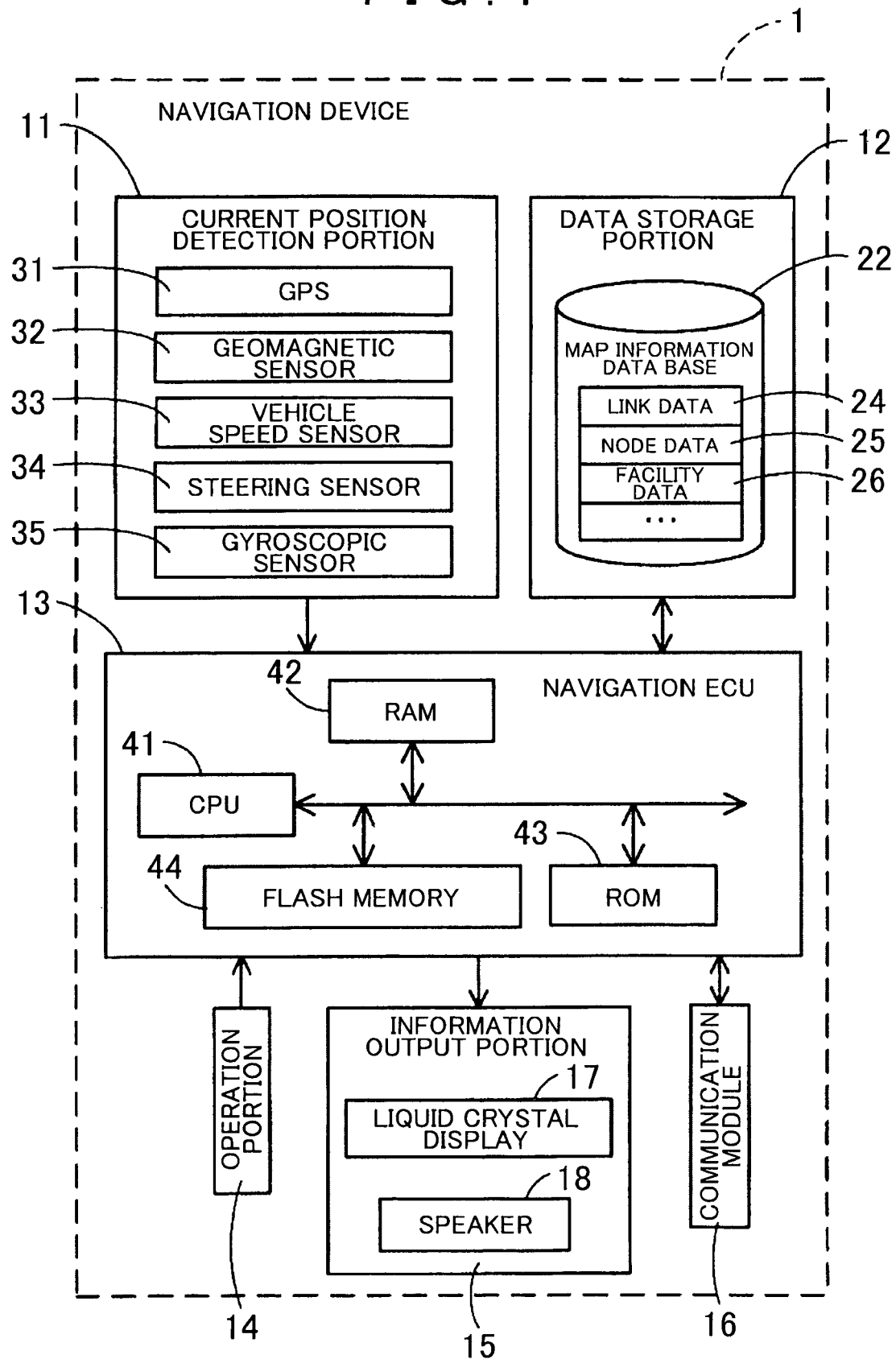
FIG. 1 is a block diagram that shows a navigation device according to an embodiment.

A specific embodiment of a driving guidance device according to the present invention that is implemented in a navigation device will be explained in detail below with reference to the drawings. First, an overall configuration of a navigation device 1 according to the present embodiment will be explained using FIG. 1. FIG. 1 is a block diagram that shows the navigation device 1 according to the present embodiment.

As shown in FIG. 1, the navigation device 1 according to the present embodiment is configured from a current position detection portion 11, a data storage portion 12, a navigation electronic control unit (ECU) 13, an operation portion 14, an information output portion 15, and a communication module 16. The current position detection portion 11 detects the current position of the vehicle. The data storage portion 12 stores various types of data. The navigation ECU 13 (a meter position information acquisition unit, a guidance unit, a parked vehicle detection unit, a parked position acquisition unit, a vehicle position acquisition unit, a meter specification unit, a guidance route setting unit) performs various types of computational processing based on information that is input. The operation portion 14 accepts an operation from an operator. The information output portion 15 outputs various types of information that pertain to map information, parking meter positions for on-street parking zones, and the like. The communication module 16 performs communication with information centers such as a traffic information center and the like.

Figure 2:
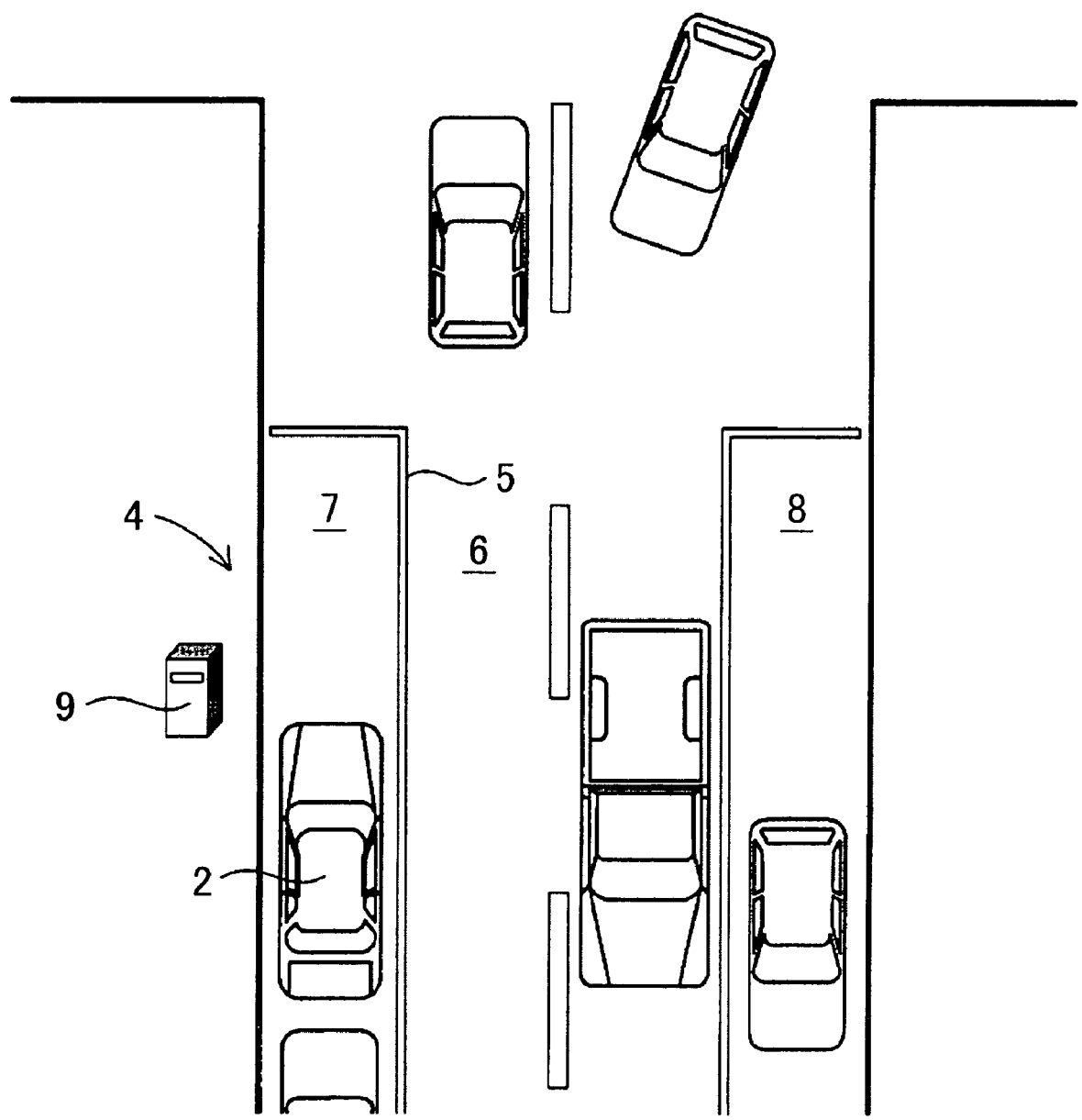
FIG. 2 shows an example of on-street parking zones that are provided in roadside strips along both sides of a two-lane street.

Next, on-street parking zones will be explained briefly using FIG. 2. On-street parking zones are parking zones that are provided on the street. FIG. 2 shows on-street parking zones 4 that are provided in roadside strips along both sides of a two-lane street. As shown in FIG. 2, the street where the on-street parking zones 4 are provided is divided by boundary lines 5, which are white lines or the like, into a two-lane driving area 6 in which the vehicle 2 travels and parking available spaces 7, 8. That is, the areas that are enclosed by the boundary lines 5 are the parking available spaces 7, 8 of the on-street parking zones 4. Note that in the on-street parking zones 4 shown in FIG. 2, the parking available spaces 7, 8 are respectively provided in the roadside strips on the left and right sides of the street, but a parking zone may also be provided in a roadside strip on only one side of the street.

A parking meter 9 is installed near the parking available spaces 7, 8. A user of the on-street parking zones 4, after parking a vehicle 2 in one of the parking available spaces 7, 8, obtains a parking stub by inserting a specified amount of money into the parking meter 9. The user can park in the on-street parking zones 4 for a specified period of time by placing the obtained parking stub on the parked vehicle 2.

Note that on-street parking zones are also called parking bays, parking zones, surface parking zones, street parking zones, road shoulder parking zones, and limited time parking zones.

With known technologies for the on-street parking zone described above, the problems described below have occurred.

First, in a case where the user does not know the position of a parking meter ahead of time, even if it is assumed that the vehicle will be parked in a position close to the destination, there is concern that the parking meter will be located at a considerable distance from the parking position. This creates a problem in that it may cause the user to be late in arriving at the destination.

Second, because information such as the use fee for the on-street parking zone, the hours when parking is permitted, and the like, is provided on the parking meter itself, the user cannot acquire the information if he cannot check the parking meter.

Each of the configuring elements of the navigation device 1 will be explained in order below.

The current position detection portion 11 includes a GPS 31, a geomagnetic sensor 32, a vehicle speed sensor 33, a steering sensor 34, a gyroscopic sensor 35, an altimeter (not shown in the drawings), and the like, and is capable of detecting the vehicle's current position, heading, running speed, and the like. The vehicle speed sensor 33, in particular, is a sensor for detecting the vehicle's speed and distance traveled. The vehicle speed sensor 33 generates a pulse in response to the rotation of the vehicle's wheels and outputs a pulse signal to the navigation ECU 13. The navigation ECU 13 counts the generated pulses to compute the revolution speed of the wheels and the distance traveled. Note that it is not necessary for the navigation device 1 to be provided with all of the five types of sensors described above, and it is acceptable for the navigation device 1 to be provided with only one or a plurality among the five types of sensors.

The data storage portion 12 includes a hard disk (not shown in the drawings) as an external storage device and a storage medium, as well as a recording head (not shown in the drawings). The recording head serves as a driver for reading a map information data base 22, specified programs, and the like that are stored on the hard disk and for writing specified data to the hard disk.

The map information data base 22 stores various types of map data that are necessary for route guidance, traffic information guidance, and map displays. Specifically, the map data include link data 24 that pertains to the forms of roads (links), node data 25 that pertains to node points, facility data 26 that pertains to facilities, search data for searching for routes, intersection data that pertains to various intersections, search data for searching for geographical points, image drawing data for drawing images of maps, roads, traffic information, and the like on a liquid crystal display 17, and the like.

The link data 24 includes link lengths for each link that is included in a road, as well as data on the road to which each link belongs, such as the width, the slope, the cant, and the bank of the road, the state of the road surface, the number of lanes in the road, locations where the number of lanes decreases, locations where the road width narrows, crosswalks, and the like. The link data 24 also includes data that pertains to corners, such as the radii of curvature, intersections, T intersections, entrances to and exits from the corners, and the like. The link data 24 also includes data that pertain to road attributes, such as downhill roads, uphill roads, and the like. The link data 24 also includes data that pertain to road types, such as ordinary roads like national routes, prefectural routes, city streets, and the like, as well as toll roads like national expressways, urban expressways, ordinary toll roads, toll bridges, and the like. In addition, the link data 24 includes data that pertain to toll roads, such as data on roads (ramps) for toll road entrances and exits, toll plazas (interchanges), and the like.

The node data 25 includes data on branching points in actual roads (including intersections, T intersections, and the like), the coordinates (locations) of node points that are set at specified intervals according to the radii of curvature and the like of various roads, node attributes that indicate whether nodes correspond to intersections or the like, connecting link number lists that list the link numbers of the links that connect to the nodes, linked node number lists that list the node numbers of nodes that are linked to one another through links, data that pertain to the heights (elevations) of various node points, and the like.

The facility data 26 includes data that pertains to various types of facilities, such as hotels, hospitals, gas stations, parking locations, including on-street parking zones, tourist facilities, restaurants, service areas, and the like in various regions.

Next, the data within the facility data 26 that pertain to on-street parking zones in particular will be explained using FIG. 3. FIG. 3 is a figure that shows an example of the facility data that pertain to on-street parking zones and are stored in the map information data base 22.

As shown in FIG. 3, the facility data that pertain to an on-street parking zone include an identification ID that identifies the on-street parking zone, a link ID of the link on which the on-street parking zone is provided, an hours available that indicates the hours when the user can use the on-street parking zone, a use fee that is required when using the on-street parking zone, location coordinates that indicate the location of the on-street parking zone, a vacant space probability that indicates a predicted state of parking space availability, user restrictions that indicate restrictions on who can use the on-street parking zone, and parking meter coordinates that specify the coordinates of the positions where the parking meters for the on-street parking zone are installed. Note that for an on-street parking zone for which the use fee varies according to the time slot (for example, 9:00 to 12:00, 12:00 to 21:00), a use fee is stored for each time slot. Note also that the location coordinates that are stored include the coordinates of the point where the on-street parking zone starts and the coordinates of the point where the on-street parking zone ends. When the on-street parking zone is provided over the entire length of a link, the location coordinates are the coordinates of both ends of the link. The vacant space probability is a value that is computed based on past parking circumstances in the on-street parking zone and is equivalent to the ratio of vacant spaces to the total number of parking spaces in the on-street parking zone. Note that the current parking circumstances in the on-street parking zone may also be acquired from a center, and the vacant space probability may be computed based on the acquired current parking circumstances. Accumulated vacancy information for the parking spaces may also be stored for each day of the week and each time slot, and the vacant space probability may be computed and stored for each day of the week and each time slot, based on statistical results for the accumulated vacancy information. The user restrictions include various types of conditions such as "no restrictions", "residents only", "handicapped only", and the like. The parking meter coordinates that are stored include the coordinates of the positions of all of the parking meters for each of the on-street parking zones. Note that the number of corresponding parking meters that are installed varies depending on the on-street parking zone. Basically, the longer an on-street parking zone is, the more parking meters are provided. However, no parking meters are installed for an on-street parking zone for which there is no use fee all day, so the parking meter coordinates are not stored in that case.

For example, in the facility data shown in FIG. 3, the information that is stored for an on-street parking zone A indicates that the zone is located from (x1, y1) to (x2, y2) on a link with the link ID 000001, that the zone can be used at no charge from 0:00 to 24:00, with no user restrictions, that the vacant space probability is 0.42, and that no parking meter is installed. The information that is stored for an on-street parking zone B indicates that the zone is located from (x3, y3) to (x4, y4) on a link with the link ID 002468, that the zone can be used at a charge of 700 yen per 60 minutes from 0:00 to 24:00, with no user restrictions, that the vacant space probability is 0.45, and that a parking meter is installed at (X1, Y1). The same sort of information is also stored for the other on-street parking zones.

In the navigation device 1 according to the present embodiment, guidance to the on-street parking zones is provided based on the facility data 26 that pertain to the on-street parking zones and are stored in the map information data base 22. In particular, when the vehicle is parked in an on-street parking zone, guidance is provided to the position of a parking meter for the on-street parking zone in which the vehicle is parked. During ordinary driving as well, guidance is provided to the on-street parking zones and parking meter positions that are located in the area around the vehicle.

The navigation ECU 13 is an electronic control unit that performs overall control of the navigation device 1, including guidance route setting processing that sets the guidance route from the current position to the destination in a case where the destination has been selected, parking guidance processing that provides parking meter guidance to the vehicle when it is parked in an on-street parking zone, driving guidance processing that provides guidance pertaining to the on-street parking zones and parking meters in the area around the vehicle when the vehicle is in motion, and the like. The navigation ECU 13 includes a CPU 41, as well as a RAM 42, a ROM 43, and a flash memory 44 as internal storage devices. The CPU 41 serves as a computational device and a control device. The RAM 42 is used as a working memory for the various types of computational processing that the CPU 41 performs, and it also stores route data when a route has been found, an en route list that will be described later (FIG. 9), and the like. The ROM 43 stores programs for controlling the various types of devices that are included in the navigation device 1. The flash memory 44 stores programs that are read from the ROM 43, a parking guidance processing program (refer to FIG. 4), a driving guidance processing program (refer to FIG. 7), and the like.

The operation portion 14 is operated at times such as when the destination is input as a guidance end point and includes a plurality of operation switches (not shown in the drawing), such as various types of keys, buttons, and the like. Based on switch signals that are output by operating the various operation switches, such as by pressing or the like, the navigation ECU 13 controls the various types of corresponding operations that are executed. Note that the operation portion 14 can also be configured as a touch panel that is provided on the front surface of the liquid crystal display 17. In some cases, the operation portion 14 is also used to input a departure point as a guidance start point.

The information output portion 15 is configured from the liquid crystal display 17, a speaker 18, and the like, and outputs for the user various types of information that pertain to a map of the area around the vehicle, the guidance route, the positions of the parking meters for the on-street parking zones, and the like.

The liquid crystal display 17 that is included in the information output portion 15 is provided in the center console or on the instrument panel surface in the vehicle's passenger cabin, and it displays a map image that includes a road, traffic information, operation guidance, an operation menu, guidance to the keys, the guidance route from the current position to the destination, guidance information along the guidance route, news, a weather forecast, the current time, e-mail, a television program, and the like. In addition, when the vehicle approaches an on-street parking zone, the liquid crystal display 17 displays information items that pertain to the on-street parking zone (the position of the parking meter, the hours when the zone can be used, the use fee, the vacant space probability, the user restrictions, and the like). The liquid crystal display 17 also displays the position of the corresponding parking meter in a case where the vehicle is parked in an on-street parking zone.

The speaker 18 that is included in the information output portion 15 outputs traffic information guidance and voice guidance that guides driving along the guidance route, based on a command from the navigation ECU 13. In a case where the vehicle is parked in an on-street parking zone, voice guidance is output that provides guidance on the position of the corresponding parking meter.

The communication module 16 is a communication device, such as a mobile telephone or a DCM, for example, that receives traffic information that is transmitted from a traffic information center, such as the Vehicle Information and Communication System (VICS (registered trademark)) center, a probe center, or the like, for example. The traffic information includes various types of information, such as congestion information, regulatory information, parking site information, traffic accident information, and the like.

The navigation device 1 may also include a DVD drive. The DVD drive is a drive that is capable of reading data that is recorded in a recording medium such as a DVD, a CD, or the like. The map information data base 22 is updated and the like based on the data that is read.

Figure 4:
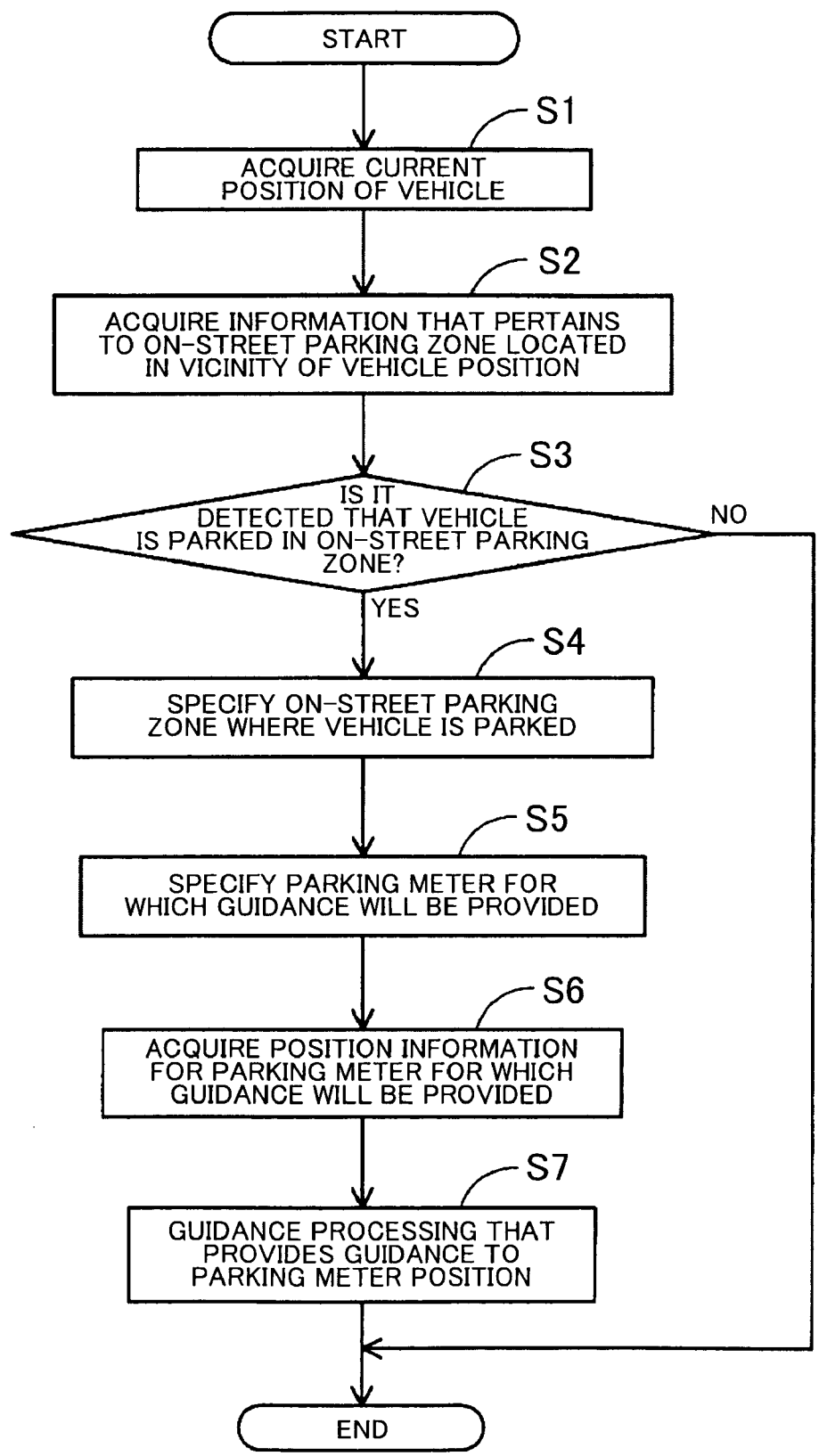
FIG. 4 is a flowchart of a parking guidance processing program according to the embodiment.

Next, the parking guidance processing program that is executed by the CPU 41 in the navigation device 1 that has the configuration described above will be explained based on FIG. 4. FIG. 4 is a flowchart of the guidance route setting processing program according to the present embodiment. The parking guidance processing program is executed at specified intervals (for example, every 200 milliseconds) after the vehicle's ignition switch is turned on, and it is a program that provides guidance to a corresponding parking meter when the vehicle is parked in an on-street parking zone. Note that the program that is shown in the flowchart in FIG. 4 is stored in the RAM 42 and the ROM 43 that are provided in the navigation device 1 and is executed by the CPU 41.

In the parking guidance processing program, the CPU 41 first acquires the current position of the vehicle at step (hereinafter abbreviated as "S") 1. Specifically, the current position of the vehicle is first detected by the GPS 31, and map matching processing is then performed that specifies the current position of the vehicle on a map, based on map information that is stored in the map information data base 22. Note that in a case where, at S3, which is described later, it is detected that the vehicle is parked in an on-street parking zone, the current position of the vehicle that is acquired at S1 is equivalent to a parked position in the on-street parking zone. Furthermore, S1 is equivalent to processing by a parked position acquisition unit.

Next, at S2, the CPU 41 acquires from the map information data base 22 the facility data 26 (refer to FIG. 3) that pertain to the on-street parking zones that are in the vicinity of the vehicle's current position that was acquired at S1 (for example, within a two-kilometer radius of the vehicle's current position, or within a search block that includes the vehicle's current position).

Next, at S3, the CPU 41 determines whether or not the vehicle is parked in an on-street parking zone, based on the vehicle's current position that was acquired at S1 and on the facility data 26 that pertain to the on-street parking zones and were acquired at S2. Specifically, the CPU 41 determines that the vehicle is parked in an on-street parking zone if the vehicle's shift position is detected as being changed to "P" and if the vehicle's current position is within an on-street parking zone at the time that the shift position is detected as being changed to "P". Note that S3 is equivalent to processing by a parked vehicle detection unit.

In a case where it is determined that the vehicle is parked in an on-street parking zone (YES at S3), the processing proceeds to S4. On the other hand, in a case where it is determined that the vehicle is not parked in an on-street parking zone (NO at S3), the parking guidance processing program is terminated.

At S4, the CPU 41 specifies the on-street parking zone in which the vehicle is parked, based on the vehicle's current position that was acquired at S1 and on the facility data 26 that pertain to the on-street parking zones and were acquired at S2.

Next, at S5, from among the parking meters for the on-street parking zone that was specified at S4, the CPU 41 specifies the parking meter for which guidance will be provided.

The method by which the parking meter for which guidance will be provided is specified at S5 will be explained below.

First, in a case where only one parking meter is installed for the on-street parking zone that was specified at S4, that parking meter is specified as the parking meter for which guidance will be provided.

On the other hand, in a case where a plurality of parking meters are installed in a plurality of positions for the on-street parking zone that was specified at S4, the parking meter for which guidance will be provided is specified based on the criteria (1) to (4) below.

(1) Of the parking meters that are installed along a road of the same name as the road on which the vehicle is parked and next to the roadside strip in which the vehicle is parked, the parking meter that is specified is the parking meter that is installed in the position that is closest to the position where the vehicle is parked, based on the straight-line distance.

(2) Of the parking meters that are positioned next to the roadside strip in which the vehicle is parked, the parking meter that is specified is the parking meter that is installed in the position that is closest to the position where the vehicle is parked, based on the straight-line distance.

(3) Of the parking meters that are installed along a road of the same name as the road on which the vehicle is parked, the parking meter that is specified is the parking meter that is installed in the position that is closest to the position where the vehicle is parked, based on the straight-line distance.

(4) The parking meter that is specified is the parking meter that is installed in the closest position, based on the straight-line distance.

To be specific, when the parking meter for which guidance will be provided is specified based on the criteria (1) to (4) above, the vehicle's current position that was acquired at S1, the parking meter coordinates for the corresponding on-street parking zone (refer to FIG. 3), and the map information that is stored in the map information data base 22 are used first to specify the parking meter based on the criterion (1) above. However, in a case where no parking meter exists that satisfies the criterion (1) above, the parking meter is specified based on the criterion (2) above. In a case where no parking meter exists that satisfies the criterion (2) above, the parking meter is specified based on the criterion (3) above. Last, in a case where no parking meter exists that satisfies the criterion (3) above, the parking meter is specified based on the criterion (4) above.

Figure 5:
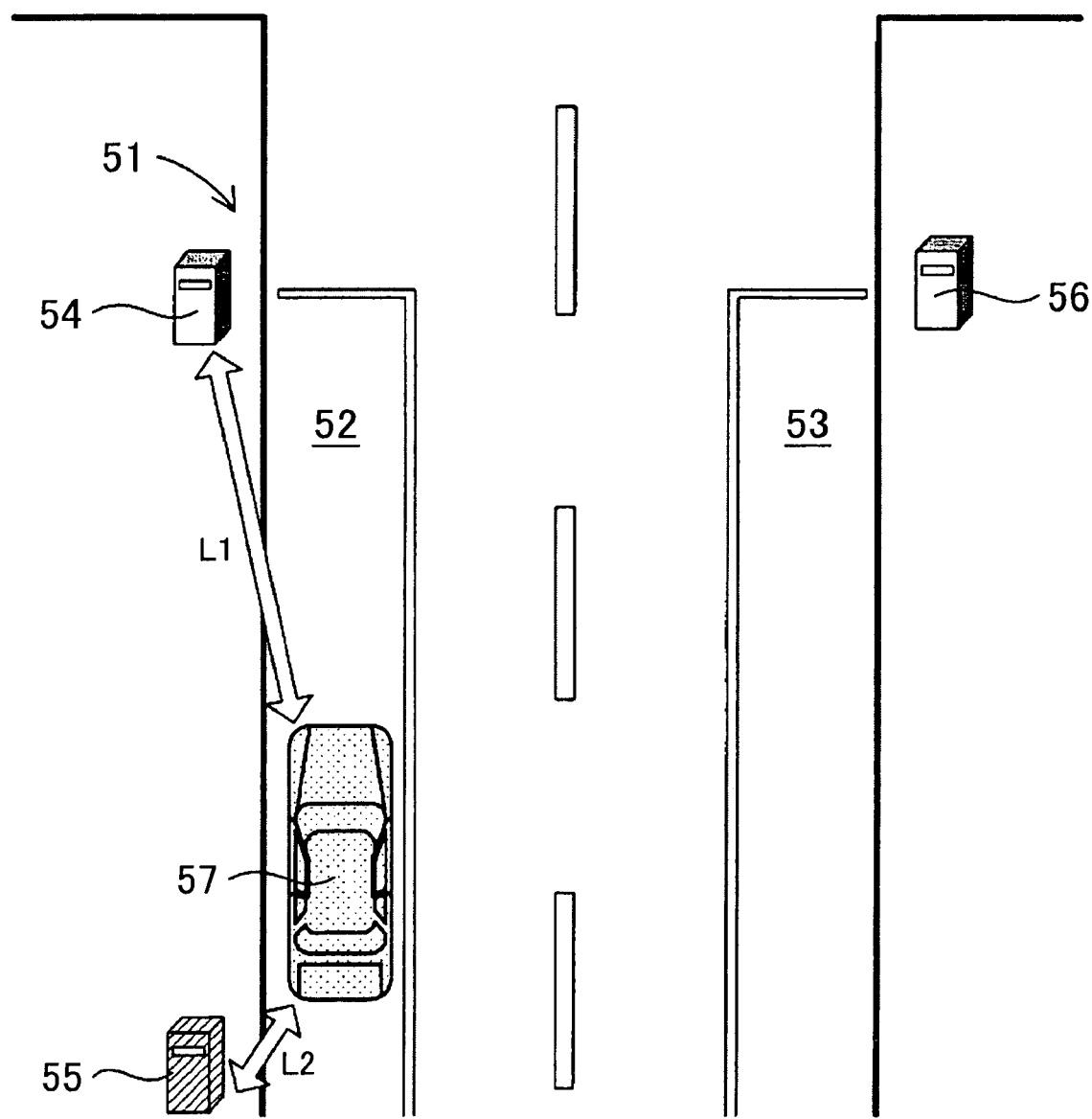
FIG. 5 is a figure for explaining a method of specifying a parking meter for which guidance will be provided.

The processing at S5 will be explained using a specific example that is shown in FIG. 5. On-street parking zones 51, shown in FIG. 5, include parking spaces 52, 53 that are provided on the left and right sides of the street, respectively. Parking meters 54 to 56 are installed at three positions in the immediate vicinity.

In this case, if a vehicle 57 is parked at a specified position in the parking space 52 shown in FIG. 5, one of the parking meters 54 to 56 is specified as the parking meter for which guidance will be provided. If the parking meter is specified based on the criteria (1) above, first the parking meters 54, 55 are identified as the parking meters that are installed along the road of the same name as the road on which the vehicle 57 is parked and next to the roadside strip in which the vehicle 57 is parked. Next, a distance L1 from the vehicle 57 to the parking meter 54 and a distance L2 from the vehicle 57 to the parking meter 55 are compared, and the distance L2 is shorter. Therefore, in the example that is shown in FIG. 5, the parking meter 55 is specified as the parking meter for which guidance will be provided.

Next, at S6, the CPU 41 acquires from the map information data base 22 information that pertains to the position of the parking meter for which guidance will be provided, as specified at S5.

Next, at S7, the CPU 41, based on the parking meter position information that was acquired at S6, performs guidance to the position where the parking meter is installed.

The guidance processing that is performed at S7 may include, for example, computations of the heading and the distance from the parked position of the vehicle to the parking meter for which the guidance is being provided, with the computed heading and distance then being displayed on the liquid crystal display 17 and output from the speaker 18.

Figure 6:
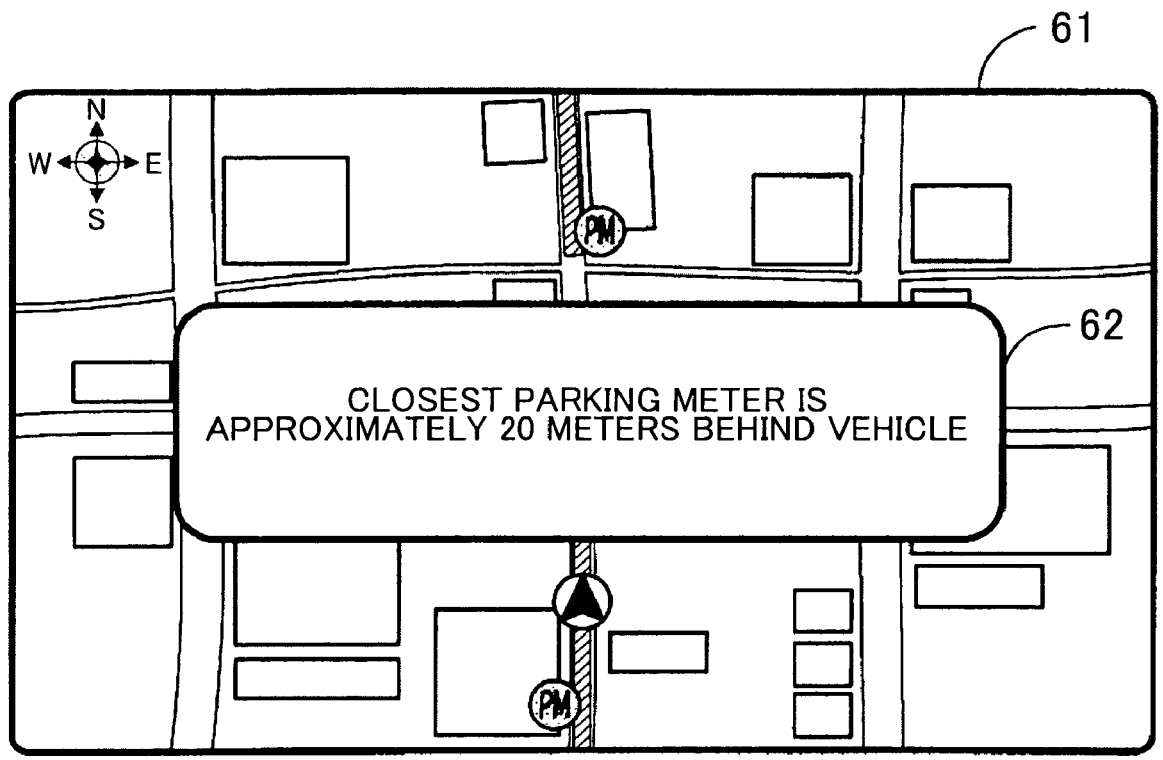
FIG. 6 is a figure that shows a parking guidance screen that is displayed on a liquid crystal display in a case where a vehicle is parked in an on-street parking zone.

FIG. 6 is a figure that shows a parking guidance screen 61 that is displayed on the liquid crystal display 17 in the navigation device 1 according to the present embodiment in a case where the vehicle is parked in an on-street parking zone.

As shown in FIG. 6, on the parking guidance screen 61, an information window 62 that shows information that pertains to the position of the parking meter is displayed such that it is superimposed on a map image. Note that the parking guidance screen 61 that is shown in FIG. 6 is displayed in a case where the parking meter for which the guidance is provided is installed in a position to the rear of the vehicle at a distance of twenty meters. Therefore, the information window 62 displays text that reads, "Closest parking meter is approximately 20 meters behind vehicle." Note that voice guidance having the same content as the text that is displayed in the information window 62 is output from the speaker 18.

Guidance may also be provided, not only for a single parking meter, but for two or more parking meters in different positions. For example, guidance may be provided for all of the parking meters that are on the same road as the on-street parking zone where the vehicle is parked. Guidance may also be provided for a specified number of the parking meters that are on the same road as the on-street parking zone where the vehicle is parked, in order by their proximity to the parked position. Guidance may also be provided for all of the parking meters that are within a specified distance from the parked position, as well as for a specified number of the parking meters that are within a specified distance from the parked position, in order of their proximity to the parked position.

Figure 7:
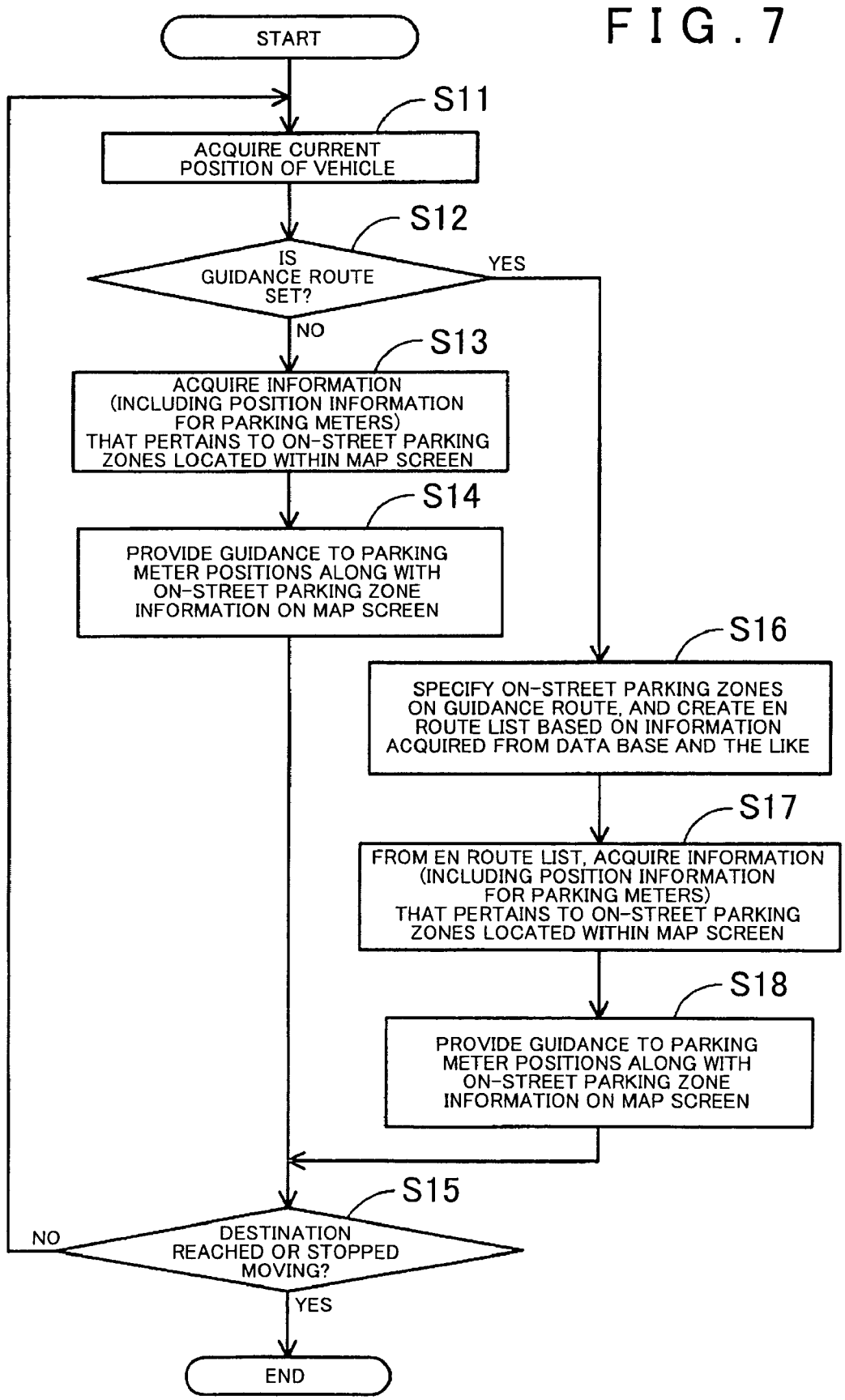
FIG. 7 is a flowchart of a driving guidance processing program according to the embodiment.

Next, the driving guidance processing program that is executed by the CPU 41 in the navigation device 1 will be explained based on FIG. 7. FIG. 7 is a flowchart of the driving guidance processing program according to the present embodiment. The driving guidance processing program is executed at specified intervals (for example, every 200 milliseconds) after the vehicle's ignition switch is turned on, and it is a program that provides guidance in the form of information that pertains to the on-street parking zones and the parking meters in the vicinity of the vehicle when the vehicle is in motion. Note that the program that is shown in the flowchart in FIG. 7 is stored in the RAM 42 and the ROM 43 that are provided in the navigation device 1 and is executed by the CPU 41.

In the driving guidance processing program, the CPU 41 first acquires the current position of the vehicle at S11. Specifically, the current position of the vehicle is first detected by the GPS 31, and map matching processing is then performed that specifies the current position of the vehicle on a map, based on map information that is stored in the map information data base 22. Note that S11 is equivalent to processing by a vehicle position acquisition unit.

Next, at S12, the CPU 41 determines whether or not a guidance route has been set in the navigation device 1. In this case, the guidance route is a route that runs from the current position of the vehicle (a departure point) to a destination that has been set by the user. The guidance route may be set based on the result of route searching by the Dykstra method, for example. Note that the route searching by the Dykstra method is a known technology, so the explanation of it will be omitted.

In a case where it is determined that the guidance route has not been set in the navigation device 1 (NO at S12), the processing proceeds to S13. On the other hand, in a case where it is determined that the guidance route has been set in the navigation device 1 (YES at S12), the processing proceeds to S16.

Next, at S13, the CPU 41 specifies the on-street parking zones that are located within a map screen that is displayed on the liquid crystal display 17, based on the current position of the vehicle that was acquired at S11, the reduction scale setting of the map that is displayed on the liquid crystal display 17, and on-street parking zone position information that is stored in the map information data base 22. Then the CPU 41 acquires from the map information data base 22 the information that pertains to the specified on-street parking zones.

Next, at S14, the CPU 41 draws a map image on the liquid crystal display 17 of the area surrounding the vehicle's position, together with the information pertaining to the on-street parking zones that was acquired at S13. Thus a driving guidance screen is displayed on the liquid crystal display 17 that provides guidance in the form of the information that pertains to the on-street parking zones. Furthermore, in the navigation device 1 according to the present embodiment, the information that pertains to the on-street parking zones specifically includes information that pertains to the positions of the parking meters, and guidance is provided to the user by displaying screen symbols and marks on the map that specify the positions of the parking meters. It is therefore easy for the user to understand visually the positions of the parking meters in the vicinity of the vehicle.

Figure 8:
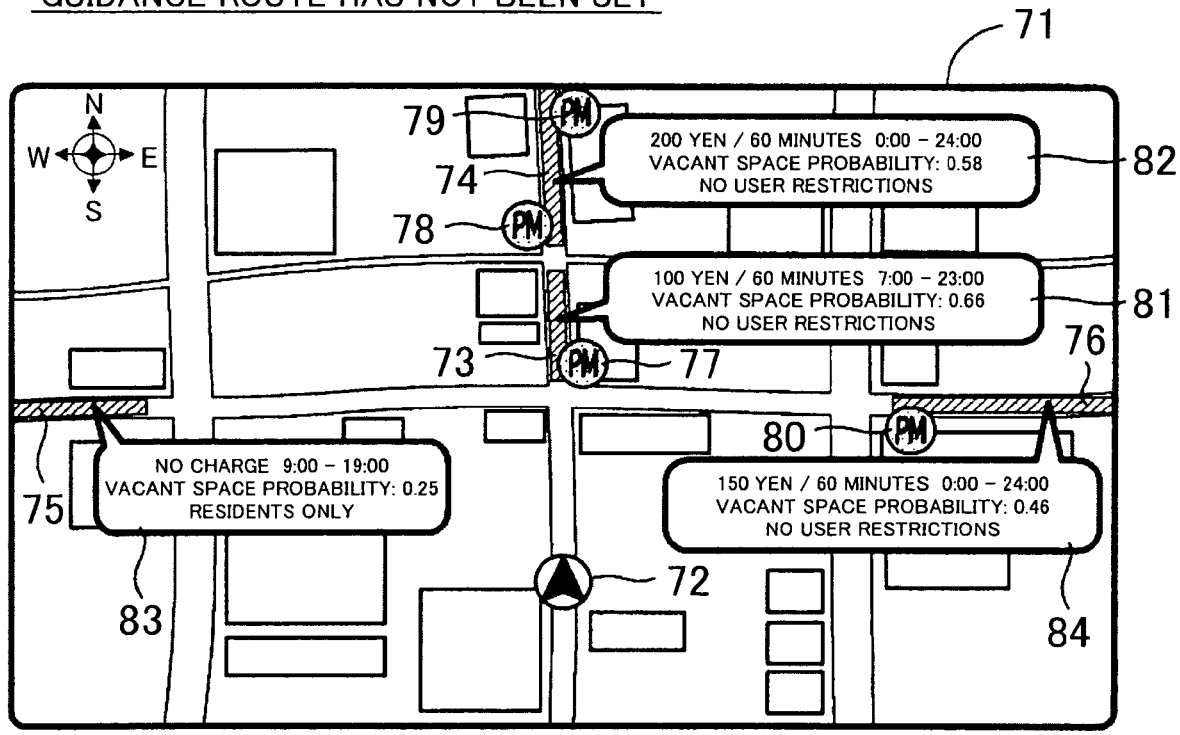
FIG. 8 is a figure that shows a driving guidance screen that is displayed on a liquid crystal display in a navigation device while the vehicle is in motion and a guidance route has not been set.

FIG. 8 is a figure that shows a driving guidance screen 71 that is displayed on the liquid crystal display 17 in the navigation device 1 according to the present embodiment while the vehicle is in motion and the guidance route has not been set.

As shown in FIG. 8, the driving guidance screen 71 includes a vehicle position mark 72 that indicates the current position of the vehicle, parking marks 73 to 76 that indicate the positions of on-street parking zones, meter position marks 77 to 80 that indicate the positions of parking meters, and information windows 81 to 84 that show information that pertains to the on-street parking zones.

The meter position mark 77 that is shown in FIG. 8 is displayed in the position of the parking meter for the on-street parking zone that is indicated by the parking mark 73. The meter position marks 78, 79 are displayed in the positions of the parking meters for the on-street parking zone that is indicated by the parking mark 74. The meter position mark 80 is displayed in the position of the parking meter for the on-street parking zone that is indicated by the parking mark 76. The information windows 81 to 84 display information in text form that pertains to the on-street parking zones that are displayed on the map. Note that the content that is displayed includes information that pertains to the use fees, information that pertains to the hours when parking is permitted, information that pertains to the vacant space probabilities, and information that pertains to the user restrictions.

Therefore, by referring to the driving guidance screen 71 that is displayed on the liquid crystal display 17, the user can obtain various types of information pertaining to the on-street parking zones that are located on the guidance route. In particular, based on the displayed positions and lengths of the parking marks 73 to 76, it is possible for the user to know the links on which the on-street parking zones are provided and the lengths of the on-street parking zones (that is, the distances over which parking is possible). It is also easy for the user to know the positions of the parking meters for each of the on-street parking zones by referring to the displayed positions of the meter position marks 77 to 80. Thus the user can decide where to park with the positions of the parking meters in mind.

Note that in the present embodiment, the positions of all of the parking meters that are located within the range displayed on the liquid crystal display 17 are displayed, but it is also possible to display only the positions of the parking meters that are located along the road on which the vehicle is currently traveling and in the direction in which the vehicle is heading. It is also possible to display only the positions of the parking meters that are located along the road on which the vehicle is currently traveling and on roads that connect to the road on which the vehicle is currently traveling.

Next, at S15, the CPU 41 determines whether or not the vehicle has arrived at the destination or has stopped moving. Note that a case in which the vehicle has stopped moving may be equivalent, for example, to a case in which the vehicle has stopped at the same point for at least a specified period of time, to a case in which the ignition switch has been turned off while the vehicle is on a link on which an on-street parking zone is provided, or the like. In a case where it is determined that the vehicle has arrived at the destination or has stopped moving (YES at S15), the driving guidance processing program terminates. On the other hand, in a case where it is determined that the vehicle has not arrived at the destination and has not stopped moving (NO at S15), the processing returns to S11, and the driving guidance continues to be provided.

At S16, which is executed in a case where it is determined that the guidance route has been set in the navigation device 1 (YES at S12), the CPU 41 specifies all of the on-street parking zones that are located on the set guidance route. The CPU 41 then acquires, from the facility data 26 that are stored in the map information data base 22 (refer to FIG. 3), the information that pertains to the specified on-street parking zones. The CPU 41 then creates an en route list based on the acquired information.

FIG. 9 is a figure that shows an example of the en route list that is created at S16. The en route list in FIG. 9 is created in a case where a guidance route is set that passes by four on-street parking zones.

As shown in FIG. 9, the information pertaining to each of the on-street parking zones that is stored in the en route list includes a sequence number that indicates the order in which the vehicle passes by the on-street parking zone when driving along the guidance route, a distance to the destination from the on-street parking zone, location coordinates that indicate the location of the on-street parking zone, an hours available that indicates the hours when the user can use the on-street parking zone, a use fee that is required when using the on-street parking zone, a vacant space probability that indicates a predicted state of parking space availability, user restrictions that indicate restrictions on who can use the on-street parking zone, parking meter coordinates that specify the coordinates of the positions where the parking meters for the on-street parking zone are installed, and the like.

Next, at S17, the CPU 41 specifies the on-street parking zones that are located within the map screen that is displayed on the liquid crystal display 17, based on the current position of the vehicle that was acquired at S11, the reduction scale setting of the map that is displayed on the liquid crystal display 17, and the en route list that was created at S16. Then the CPU 41 acquires from the en route list the information that pertains to the specified on-street parking zones. Note that S6, S13, S16, and S17 are equivalent to processing by a meter position information acquisition unit, and S13, S16, and S17 are equivalent to processing by a meter specification unit.

Next, at S18, the CPU 41 draws a map image on the liquid crystal display 17 of the area surrounding the vehicle's position, together with the information pertaining to the on-street parking zones that was acquired at S17. Thus a driving guidance screen is displayed on the liquid crystal display 17 that guides the driving of the driver along the guidance route. Furthermore, in the navigation device 1 according to the present embodiment, the information that pertains to the on-street parking zones specifically includes information that pertains to the positions of the parking meters, and guidance is provided to the user by displaying screen symbols and marks on the map that specify the positions of the parking meters. It is therefore easy for the user to understand visually the positions of the parking meters that are positioned along the guidance route.

Figure 10:
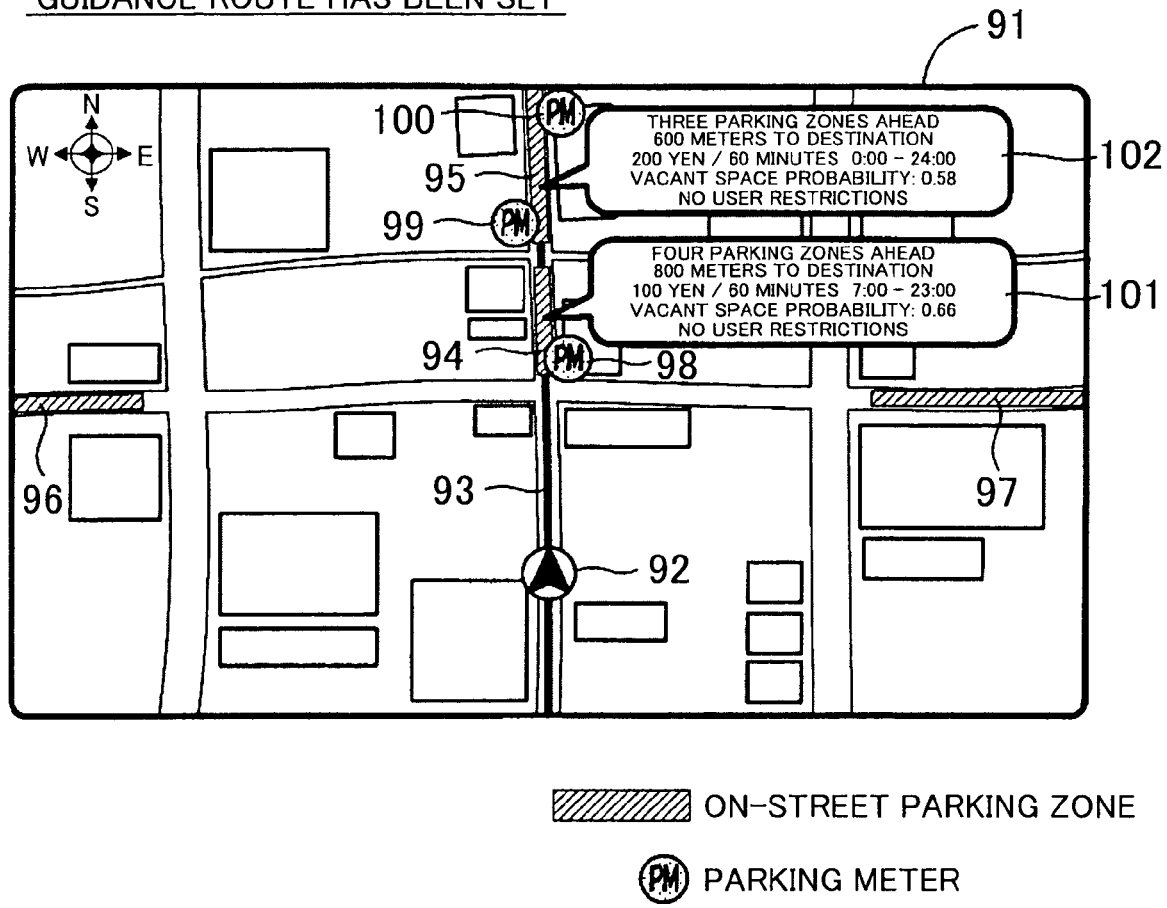
FIG. 10 is a figure that shows a driving guidance screen that is displayed on the liquid crystal display in the navigation device.

FIG. 10 is a figure that shows a driving guidance screen 91 that is displayed on the liquid crystal display 17 in the navigation device 1 according to the present embodiment.

As shown in FIG. 10, the driving guidance screen 91 includes a vehicle position mark 92 that indicates the current position of the vehicle, a driving guidance route line 93 that is drawn along the guidance route on the map image, parking marks 94 to 97 that indicate the positions of on-street parking zones, meter position marks 98 to 100 that indicate the positions of parking meters, and information windows 101, 102 that show information that pertains to the on-street parking zones.

The meter position mark 98 that is shown in FIG. 10 is displayed in the position of the parking meter for the on-street parking zone that is indicated by the parking mark 94. The meter position marks 99, 100 are displayed in the positions of the parking meters for the on-street parking zone that is indicated by the parking mark 95. The information windows 101, 102 display information in text form that pertains to the on-street parking zones that are displayed on the guidance route. Note that the content that is displayed includes the number of the on-street parking zones ahead that the vehicle will pass by before it arrives at the destination, the distance from the on-street parking zone to the destination, information that pertains to the use fees, information that pertains to the hours when parking is permitted, information that pertains to the vacant space probabilities, and information that pertains to the user restrictions.

In addition to the information described above, guidance may also be provided on the straight-line distance to the destination and on the arrival time at (the distance to) the destination in the event that the user parks in the parking space and walks to the destination.

The current time may also be acquired by the GPS 31, and guidance may be provided on the vacant space probability that corresponds to the current time and on the use fee that corresponds to the current time. Guidance that corresponds to the current time may also be provided for an on-street parking zone for which the parking conditions will change, based on information about the on-street parking zone (and the parking meters). For example, guidance may be provided that says, "In another ten minutes, you can park in this parking zone at no charge."

Therefore, by referring to the driving guidance screen 91 that is displayed on the liquid crystal display 17, the user can obtain various types of information pertaining to the on-street parking zones that are located on the guidance route. In particular, based on the displayed positions and lengths of the parking marks 94 to 97, it is possible for the user to know the links on which the on-street parking zones are provided and the lengths of the on-street parking zones (that is, the distances over which parking is possible). It is also easy for the user to know the positions of the parking meters for each of the on-street parking zones that are located on the guidance route by referring to the displayed positions of the meter position marks 98 to 100. Note that S7, S14, and S18 are equivalent to processing by a guidance unit.

Next, at S15, the CPU 41 determines whether or not the vehicle has arrived at the destination or has stopped moving. Note that a case in which the vehicle has stopped moving may be equivalent, for example, to a case in which the vehicle has stopped at the same point for at least a specified period of time, to a case in which the ignition switch has been turned off while the vehicle is on a link on which an on-street parking zone is provided, or the like. In a case where it is determined that the vehicle has arrived at the destination or has stopped moving (YES at S15), the driving guidance processing program terminates. On the other hand, in a case where it is determined that the vehicle has not arrived at the destination and has not stopped moving (NO at S15), the processing returns to S11, and the driving guidance continues to be provided.

As explained in detail above, the navigation device 1 according to the present embodiment and the computer program that is executed by the navigation device 1 can make the user who has parked in an on-street parking zone easily aware of the positions of the parking meters for the parking zone, even in a case where, for example, the parking meters are not visible from the position where the vehicle is parked. This is possible because, in a case where the vehicle is parked in an on-street parking zone (YES at S3), a parking meter for which guidance will be provided is specified from among the parking meters for the on-street parking zone where the vehicle is parked (S5), and guidance is provided to the position where the specified parking meter is installed (S7). The burden on the user of searching for a parking meter after the vehicle is parked can therefore be reduced.

Further, guidance is provided to the position of the parking meter that is installed in the position that is closest to where the vehicle is parked. Therefore, the user who has parked in an on-street parking zone that is provided with a plurality of parking meters can be made aware of the position of the parking meter that is closest and easiest to use of all of the parking meters.

Guidance is also provided to the position of a parking meter that is installed next to the roadside strip in which the vehicle is parked. Therefore, the user who has parked in an on-street parking zone that is provided with a plurality of parking meters can be made aware of the position of a suitable parking meter that is easy to use among all of the parking meters.

Moreover, in a case where an on-street parking zone is located in the vicinity of the vehicle while the vehicle is in motion, guidance is provided to the position of a parking meter for that on-street parking zone (S7). This makes it possible to make the user aware in advance of the position of a parking meter that is located in the vicinity of the vehicle before the user parks in the on-street parking zone. It is therefore possible to enable the user to park close to the position of a parking meter, which can reduce the burden on the user when he parks in an on-street parking zone.

Furthermore, it is possible to make a user who is driving in accordance with a guidance route aware in advance of the position of a parking meter that is located on the guidance route. It is therefore possible for the user to park close to the position of the parking meter, which can reduce the burden on the user when he parks in an on-street parking zone. Moreover, reducing the amount of guidance that the user does not need makes it possible to provide guidance that is easier for the user to understand.

It should be understood by those skilled in the art that the present invention is not limited by the embodiment described above and that various improvements and modifications may occur insofar as they are within the scope of the present invention.

For example, in the present embodiment, in a case where the vehicle is in motion and approaches an on-street parking zone, guidance is provided constantly in the form of information that pertains to the on-street parking zone and the parking meters, but it is possible to provide the guidance only when the user has performed a specified operation. Similarly, it is possible to provide the parking meter guidance only when the user has performed a specified operation, even in a case where the vehicle is parked in an on-street parking zone.

It is also possible to provide the parking meter guidance only for an on-street parking zone that satisfies a specified condition (for example, the use fee is not greater than a specified amount, the vacant space probability is at least a specified ratio, or the distance to the destination is less than a specified distance).

The present invention may also be configured such that a camera captures an image of the surrounding environment and image processing is performed on the captured photographic image. In a case where the image processing indicates that a parking meter is included in the photographic image, the image is stored in a data base in association with the information on the position of the vehicle that is detected by the current position detection portion 11. This makes it possible to add new position information to the data base for a parking meter that is not stored in the data base. In a case where it is determined that a parking meter does not exist at a position that is stored in the data base, it is desirable for a determination to be made that the parking meter has been removed and for guidance to be no longer provided for that position.

It is also possible to update the position information for parking meters manually by using an input unit such as a touch panel. For example, in a case where the user recognizes that a parking meter for which the navigation device 1 does not provide guidance actually exists, the user can input a command to add the information for the parking meter. In a case where the user recognizes that a parking meter for which the navigation device 1 provides guidance actually does not exist, the user can input a command to delete the parking meter from the guidance. Thus it is possible to improve the accuracy of the guidance.

It is also possible to improve the accuracy of the guidance by using a communication function to obtain parking meter information from another user and updating the information in the data base based on the obtained information.

What is claimed is:

1. A vehicle guidance device for installation in a vehicle, comprising:
    a meter position information acquisition unit that acquires information on the position of a parking meter for an on-street parking zone;
    a guidance unit that provides guidance to the position of the parking meter based on the parking meter position information that is acquired by the meter position information acquisition unit; and
    a parked vehicle detection unit that detects that the vehicle is parked in the on-street parking zone;
    wherein, when the parked vehicle detection unit detects that the vehicle is parked in the on-street parking zone, the guidance unit provides guidance to the position of the parking meter for the on-street parking zone in which the vehicle is parked.

2. The vehicle guidance device according to claim 1, further comprising:
    a parked position acquisition unit that acquires information on the position where the vehicle is parked;
    wherein the guidance unit provides guidance to the position of the parking meter that is installed in the position that is closest to the position where the vehicle is parked.

3. The vehicle guidance device according to claim 1, further comprising:
    a parked position acquisition unit that acquires information on the position where the vehicle is parked;
    wherein the guidance unit provides guidance to the position of the parking meter that is installed next to a roadside strip in which the vehicle is parked.

4. The vehicle guidance device according to claim 1, further comprising:
    a vehicle position acquisition unit that acquires information on the current position of the vehicle; and
    a meter specification unit that specifies a parking meter that is located in the vicinity of the current position of the vehicle, based on the parking meter position information that is acquired by the meter position information acquisition unit;
    wherein the guidance unit provides guidance to the position of the parking meter that is specified by the meter specification unit.

5. The vehicle guidance device according to claim 4, further comprising:
    a guidance route setting unit that sets a guidance route from a departure point to a destination;
    wherein the guidance unit provides guidance to the position of a parking meter that is installed on the guidance route that is set by the guidance route setting unit.

6. A non-transitory computer-readable medium storing a computer-executable program for vehicle guidance, the program comprising:
    instructions for acquiring information on the position of a parking meter for an on-street parking zone; and
    instructions for providing guidance to the position of the parking meter based on the acquired parking meter position information; and
    instructions for detecting that the vehicle is parked in the on-street parking zone;
    instructions for, when it is detected that the vehicle is parked in the on-street parking zone, providing guidance to the position of the parking meter for the on-street parking zone in which the vehicle is parked.

7. A vehicle guidance method, comprising:
    acquiring information on the position of a parking meter for an on-street parking zone; and
    providing guidance to the position of the parking meter based on the acquired parking meter position information; and
    detecting that the vehicle is parked in the on-street parking zone;
    when the parked vehicle detection unit detects that the vehicle is parked in the on-street parking zone, providing guidance to the position of the parking meter for the on-street parking zone in which the vehicle is parked.

8. The vehicle guidance method according to claim 7, further comprising:
    acquiring information on the position where the vehicle is parked; and
    providing guidance to the position of the parking meter that is installed in the position that is closest to the position where the vehicle is parked.

9. The vehicle guidance method according to claim 7, further comprising:
    acquiring information on the position where the vehicle is parked; and
    providing guidance to the position of the parking meter that is installed next to a roadside strip in which the vehicle is parked.

10. The vehicle guidance method according to claim 9, further comprising:
    acquiring information on the current position of the vehicle;
    specifying a parking meter that is located in the vicinity of the current position of the vehicle, based on the acquired parking meter position information; and
    providing guidance to the position of the parking meter that is specified by the meter specification unit.

11. The vehicle guidance method according to claim 9, further comprising:
    setting a guidance route from a departure point to a destination; and
    providing guidance to the position of a parking meter that is installed on the set guidance route.

* * * * *